Nov. 13, 1956 F. J. HONN 2,770,605
SOLUTIONS OF COPOLYMERS OF A PERFLUOROCHLOROETHYLENE
AND A FLUOROETHYLENE
Filed Dec. 16, 1954
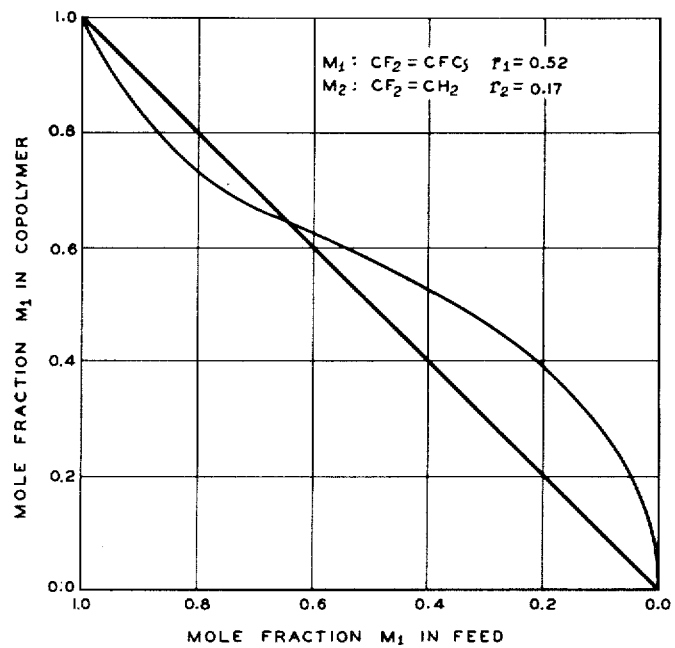
INVENTOR.
FRANCIS J. HONN

United States Patent Office 2,770,605
Patented Nov. 13, 1956

2,770,605

SOLUTIONS OF COPOLYMERS OF A PERFLUOROCHLOROETHYLENE AND A FLUOROETHYLENE

Francis J. Honn, Westfield, N. J., assignor to The M. W. Kellogg Company, Jersey City, N. J., a corporation of Delaware Application December 16, 1954, Serial No. 475,770

20 Claims. (Cl. 260—31.2)

This invention relates to halogen-containing polymeric materials. In one aspect, the invention relates to halogen-containing copolymers. More particularly in this aspect, the invention relates to solutions of copolymers of a perfluorochloroethylene and a fluoroethylene and the method for their preparation.

This is a continuation-in-part of my prior and copending application Serial No. 332,186, filed January 21, 1953.

As an accumulative group, halogen-containing polymers offer wide utility in various industrial applications, serving not only as substitutes for natural rubbers, but in some instances the various individual synthetics are superior to the natural products, e. g., in oil-resistance and aging characteristics. In this respect, polymers containing fluorine have been found to be both relatively inert and to possess good physical and chemical stability. One of the most useful polymers in this field is the perfluorochloroethylene polymer of trifluorochloroethylene. This particular polymer of trifluorochloroethylene has now been developed to a stage in which it is commercially available and has many useful applications by reason of its chemical inertness, and high physical strength and resilience, when in the form of a plastic. Four-fifths of the weight of polytrifluorochloroethylene is made up of fluorine and chlorine. The plastic form of polytrifluorochloroethylene is colorless and transparent, and has a high chemical stability with no effect being observed on the polymer after prolonged exposure to hydrofluoric acid, hydrochloric acid, and strong caustic solutions, as well as fuming nitric acid, aqua regia and other vigorous oxidizing materials. The plastic form of this polymer exhibits flexibility and resilience, is not affected by water, or by humidity, and, in general, is an efficient insulating material.

With particular reference to the utility of perfluorochloroethylene polymers, such as trifluorochloroethylene in particular, it has been found desirable to employ these polymers in the form of relatively hard protective coatings or films on surfaces which are fairly rigid or on surfaces in which flexibility is not a prime requisite, and under conditions in which these surfaces may come into contact with any of the aforementioned oxidizing materials, oils, fuels, and other powerful reagents, under varying temperature conditions. Since the plastic polymers of perfluorochloroethylenes, particularly plastic polymers of trifluorochloroethylene, are of high molecular weight, these polymers are difficult to melt and apply in the liquid state, these polymers have heretofore been applied to various surfaces in the form of dispersion in suitable diluents or carriers. It has been found, however, that with such dispersions, e. g., dispersions of polytrifluorochloroethylene, relatively long periods of time are required to permit the dispersed particles to flow and form a continuous protective coating or film on the surface to be protected, by reason of the slow rate of flow of the homopolymer. Furthermore, it has been found that in applying such dispersions to the surface to be coated, relatively high temperatures, usually in excess of 250° C., must be employed in order to evaporate the diluent or carrier and fuse the particles of the homopolymer plastic to form a continuous coating or film. When such temperatures are employed, in many instances these temperatures tend to destroy the metal or fabric surface sought to be coated. This is particularly apparent where the metallic surface comprises materials employed in the manufacture of aircraft component parts, or protective suitings or other articles of clothing, in which lack of rigidity or drape is not a prime requisite. If one attempts to dissolve the aforementioned homopolymer in various reagents, in which the homopolymer is soluble (rather than in dispersants or carriers), it is found that the homopolymer is not soluble at room temperature in any known solvent. The production of a perfluorochloroethylene, such as polytrifluorochloroethylene, in a form in which it is readily soluble in various solvents at room temperature, to produce relatively hard surface coatings and films, and which are easily vulcanized, is much desired.

It is, therefore, an object of this invention to provide new polymers suitable as coatings or films having desirable physical and chemical characteristics, exhibiting the properties of corrosion-resistance to oils, fuels, and various powerful reagents, and at the same time possess relatively high hardness, flexibility at relatively low temperatures, and which are also soluble in various solvents and other vehicles at room temperature, and are also easily vulcanized.

It is another object of this invention to provide solvents for these copolymers which solvents form solutions which may be used in the preparation of coating and cement compositions.

Various other objects and advantages of the present invention will become apparent to those skilled in the art from the accompanying disclosure and description.

The polymers of the present invention are resinous copolymers of a perfluorochloroethylene, such as trifluorochloroethylene, and a fluoroethylene, such as vinylidene fluoride, and are of special value as durable coatings or films for metal surfaces or fabrics, in which rubberiness or flexibility are not a prime requisite. The copolymers of the present invention contain the perfluorochloroethylene in an amount which is more than 69 mole percent and not higher than 80 mole percent, and the remaining major constituent is the fluoroethylene. In general, as more fully hereinafter described, these copolymers are prepared by copolymerizing a perfluorochloroethylene (e. g. trifluorochloroethylene) with the fluoroethylene (e. g., vinylidene fluoride) at temperatures between about —25° C. and about 50° C. in the presence of a polymerization catalyst, either as an inorganic promoter in the form of a water-suspension type recipe or as an organic peroxide promoter in mass or bulk type polymerization. The copolymerization of the aforementioned monomers produces resinous, moldable, relatively hard copolymers. These copolymers are flexible, even at temperatures as low as —65° F., retain superior strength and hardness, and do not become embrittled after aging even at temperatures as high as about 550° F. These copolymers are chemically and thermally stable, oil and fuel-resistant, are not attacked by strong oxidizing materials and reagents, are soluble in various solvents and vehicles at room temperature for application to various surfaces, are vulcanizable, and are particularly suited as durable relatively hard coatings for application to metallic and other rigid surfaces, and flexible materials, in which lack of rigidity and/or drape are not prime requisites.

As indicated above, the polymers of the present invention are resinous copolymers of a perfluorochloroethylene, such as trifluorochloroethylene, ($CF_2$=$CFCl$), and a fluoroethylene, such as vinylidene fluoride, ($CF_2$=$CH_2$).

Examples of other perfluorochloroethylenes that may be employed in preparing the copolymers of the present invention are 1,1-dichloro-2,2-difluoroethylene, $$(CCl_2=CF_2);$$

1,2-dichloro-1,2-difluoroethylene ($CFCl=CFCl$); and trichlorofluoroethylene ($CFCl=CCl_2$). Examples of other fluoroethylenes that may be employed with perfluorochloroethylenes to obtain the copolymers of the present invention are trifluoroethylene ($CF_2=CFH$); vinyl fluoride ($CFH=CH_2$); and 1,2-difluoroethylene $$(CFH=CFH).$$

In carrying out the polymerization reaction between the perfluorochloroethylene and the fluoroethylene monomers to produce the copolymers of the present invention, it has been indicated that the finished copolymers contain the perfluorochloroethylene in an amount which is more than 69 mole percent (i. e., above 69 mole percent but not more than 70 percent as a lower limit) and not higher than about 80 mole percent, with the remaining major constituent being the fluoroethylene. If the finished copolymer contains less than the aforementioned lower limit of slightly more than 69 mole percent of the perfluorochloroethylene monomer, the copolymer tends to exhibit properties of being less chemically inert to the aforementioned oxidizing agents and other powerful reagents, due to the high increase in fluoroethylene content. If one the other hand, the finished copolymer contains more than about 80 mole percent of the perfluorochloroethylene monomer, the copolymer is hard to get into solution, in various solvents, and, therefore, loses its desirability as an easily-applied surface coating or film. Within this critical range, it is preferred that the finished copolymers contain the perfluorochloroethylene monomer in an amount which is higher than 69 mole percent and up to about 75 mole percent, with the fluoroethylene monomer constituting the remaining major constituent.

To attain all the advantages inherent in each of the aforementioned copolymer systems, the copolymers of any desired compositions should be as uniform as possible, that is each polymeric molecule should contain essentially the same proportion of the perfluorochloroethylene monomer to the fluoroethylene monomer, as every other polymeric molecule in the batch. In other words, the molar ratio in a polymeric molecule should correspond as closely as possible to the other molecules in the same batch. If the respective copolymers are heterogeneous, the aforementioned desired physical and chemical properties may tend to be distorted.

The polymerization reaction is carried out, as indicated above, at a temperature between about $-25°$ C. and about $50°$ C. When the polymerization promoter is in the form of a water-suspension type recipe, the reaction is preferably carried out at a temperature between about $0°$ C. and about $35°$ C. When the polymerization promoter is an organic peroxide promoter in a mass polymerization system, the reaction is preferably carried out at a temperature between about $-20°$ C. and about $0°$ C. Of the water-suspension recipe type catalysts, a redox catalyst system is preferred (having no emulsifier) and contains an oxidant, a reductant and a variable valence metal salt. The oxidant in the water-suspension type recipe is preferably an inorganic persulfate, such as potassium persulfate, sodium persulfate or ammonium persulfate. The reductant is preferably a bisulfite such as sodium bisulfite or potassium bisulfite. The variable valence metal salt, which is employed for the purpose of regenerating the oxidant, is preferably in the form of an iron salt such as ferrous sulfate or ferrous nitrate, with ferrous sulfate being the most desirable variable valence metal salt. Of the organic peroxide promoters halogen substituted acetyl peroxides are employed in carrying out the copolymerization in the absence of a suspension agent. Trichloroacetyl peroxide is a preferred promoter of this type. Other halogen substituted organic peroxides suitable for carrying out the copolymerization are trifluoroacetyl peroxide, difluoroacetyl peroxide 2,4-dichlorobenzoyl peroxide, chloroacetyl peroxide, trifluorodichloropropionyl peroxide and dichlorofluoroacetyl peroxide.

In carrying out the above-mentioned polymerization procedure, the monomer reactivity ratios for the perfluorochloroethylene and the fluoroethylene, are calculated in accordance with the Mayo, Lewis and Walling equation. This equation is represented as follows:

$$* \; -\frac{d[M_1]}{d[M_2]} = \frac{[M_1]}{[M_2]} \frac{r_1[M_1]+[M_2]}{[M_1]+r_2[M_2]}$$

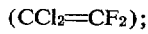
* Reference: "Copolymerization," F. R. Mayo and Cheves Walling, Chemical Reviews, vol. 46, pages 195–197.

wherein $r_1$ and $r_2$ are parameters, $M_1$ and $M_2$ are concentrations in moles of monomer 1 and monomer 2. The equation describes the composition of the copolymer being formed at any instant, $$\frac{d[M_1]}{d[M_2]}$$

from a polymerization mixture of two monomers at concentrations $M_1$ and $M_2$ by means of two parameters, $r_1$ and $r_2$. These parameters (i. e., the monomer reactivity ratios), each represents the ratio of two rate constants for the reaction of a chain with a given monomer unit on the growing end with its own type of monomer, and with the other type of monomer.

For producing a copolymer of trifluorochloroethylene and vinylidene fluoride, as a representative copolymer of the present invention, monomer reactivity ratios calculated in accordance with the Mayo, Lewis and Walling equation, are $r_1=0.52\pm0.12$, where $M_1$ is trifluorochloroethylene, and $r_2=0.17\pm0.02$, where $M_2$ is vinylidene fluoride. These values indicate that each monomer prefers to add to the other monomer rather than to itself during polymerization, and results in a strong tendency towards alternation in this system. These values also indicate that there is an azeotropic feed ratio at which the copolymer and monomer compositions remain identical over the entire conversion scale.

An instantaneous copolymer feed-composition diagram, derived from the above values, is shown in the accompanying drawing. By reference to the curved line of the drawing, the proper feed may be selected for the instantaneous preparation of the copolymer, of desired composition, which has more than 69 mole percent and not more than 80 mole percent of trifluorochloroethylene, and the remaining major constituent being vinylidene fluoride.

According to this diagram, a 65/35 molar ratio of trifluorochloroethylene/vinylidene fluoride copolymer is azeotropic, a shown by the straight line of the drawing, that is, the composition of the copolymer remains constant and equal to that of the feed over the entire range of up to approximately 100 percent conversion. If an attempt is made to prepare a particular copolymer ratio (other than the azeotropic molar ratio), by feeding a single charge of constant composition (i. e., one which has been calculated to yield instantaneously a copolymer of desired composition), the less reactive monomer will lag in the reaction. As the copolymerization proceeds, the copolymer becomes excessively rich and the more reactive monomer and assumes, to a greater degree, the properties characteristic of the more reactive monomer. As the relative concentration of the less reactive monomer to the more reactive monomer increases, the less reactive monomer is drawn more and more into the reaction. The copolymer produced becomes rich in respect to that monomer and eventually a homopolymer of the less reactive monomer will be obtained when the more reactive monomer is exhausted. This unevenness of reaction leads to an excessive spread in molar ratios found in the resulting copolymers.

In view of the inequality of reactivity, the charging of the monomers to the reactor, either in increments or as a continuous charge, should be carried out in such manner that the resulting copolymer composition varies by not more than ±2 mole percent from chain to chain.

It has been found that the perfluorochloroethylene/fluoroethylene copolymers, e. g., copolymers of trifluorochloroethylene and vinylidene fluoride, which have an initial molar ratio of 75/25, vary to such an extent that at a conversion between about 70 and 80 percent, the vinylidene fluoride will be exhausted from the feed, and that any polymers produced thereafter will comprise pure polytrifluorochloroethylene. If the copolymer produced is to be made sufficiently homogeneous, the monomers must be added incrementally or continuously so that the monomer composition is maintained at a constant level or the conversion is restricted to about 50 percent, where the copolymer does not vary by more than ±2 mole percent from the average. To produce a copolymer of desired molar ratio through increment feeding, it is necessary to determine the molar ratio required for the initial monomer charge, which will, at the instant polymerization begins, yield a copolymer of desired molar ratio. As the concentration of the less reactive monomer increases, increment charges of composition designed to restore or maintain the molar ratio of the monomer phase at or near the initial molar level, are added. The number of increment feedings will be governed by the molar spread which may be tolerated. When the increment charges become so numerous as to be continuous, a charge of constant composition (the composition being equal to the molar ratio of the copolymer being formed) may be pumped into the polymerization reactor at a rate equal to the rate of polymerization. The variations involved in continuous feeding will be limited to the errors imposed by the pumping apparatus itself.

In general, the feed composition will comprise between about 75 mole percent and about 90 mole percent of the perfluorochloroethylene and the remainder of the copolymer feed being made up of the fluoroethylene to produce a copolymer having more than 69 and not more than 80 mole percent of the perfluorochloroethylene. To produce a copolymer within the preferred range in which the perfluorochloroethylene is present in an amount which is higher than 69 and not more than about 75 mole percent, the feed composition will comprise between about 80 mole percent and about 85 mole percent of the perfluoroethylene.

The aforementioned copolymerization reaction between the perfluorochloroethylene and the fluoroethylene monomers to produce the copolymers of the present invention, is carried out at pressures between about 85 and about 250 pounds per square inch.

As previously indicated, the copolymers of the present invention are particularly suited and useful as durable, flexible coating for application to metal or fabric surfaces in which lack of rigidity or drape is not a prime requisite. Particularly useful solvents comprise the aliphatic and aromatic esters, the ether alcohols, and ketones. Typical examples of these solvents are di-isobutyl ketone, methyl ethyl ketone, methyl isobutyl ketone, cyclohexanone, methoxy ethanol, ethoxy ethanol, ethoxy ethoxy ethanol, ethyl acetate, methyl acetate, butyl acetate, amyl acetate, and ethyl benzoate. Because of their greater solvent power and drying rate, the lower alkyl ketones and alkyl esters of the alkyl carboxylic acids are preferred. Representative of ketones are the symmetrical ethyl, propyl, butyl and isobutyl ketones and the mixed alkyl ketones, in which one alkyl group is methyl, ethyl, propyl, butyl and isobutyl and the other alkyl group is ethyl, propyl, butyl and isobutyl, such as methyl ethyl ketone, methyl propyl ketone, methyl isobutyl ketone, ethyl isobutyl ketone. Representative of the alkyl esters are methyl acetate, ethyl acetate, propyl acetate, butyl acetate, isobutyl acetate, amyl acetate, methyl propionate, ethyl propionate, propyl propionate and butyl propionate. Of these, the acetic acid esters are preferred. In connection with the solubility of the copolymers of this invention in the various solvents, it should be noted that as a general rule an increase in the boiling point of the solvent is reflected by decrease in the solubility of the copolymer. This rule holds true except with respect to the lowest member of a homologous series. For example, while a copolymer containing trifluorochloroethylene and vinylidene fluoride in a 75/25 mole ratio is partially soluble (about 10 weight percent) in ethyl acetate, it is insoluble in ethyl formate. Again, while the same copolymer is partially soluble in methyl ethyl ketone, it is insoluble in acetone. There is no clear reason for this anomalous behavior. As an extension of the above described general rule, maximum solubility, within a particular homologous series, is obtained when the solvent has a boiling point between about 55° C. and about 160° C.

The solubility of the copolymers of this invention is also a function of the mole ratio of the fluorochloroethylene, such as trifluorochloroethylene to the fluorochloroethylene, such as vinylidene fluoride. For example, when approximately 10 weight percent of a copolymer containing trifluorochloroethylene and vinylidene fluoride in a 75/25 mole ratio was admixed with the preferred solvents listed above, partial solution of the copolymer was observed, i. e., the solutions were either hazy or cloudy or small quantities of undissolved particles were observed. On the other hand, when a copolymer of trifluorochloroethylene and vinylidene fluoride in a 70/30 mole ratio was blended with the preferred solvents listed above, clear solutions were obtained in concentrations of solute exceeding approximately 20 weight percent and the solutions did not begin to cloud or haze until a concentration of approximately 30 weight percent of solute was reached. Thus, with respect to the copolymers of this invention, maximum solubility is obtained with copolymers which contain between above about 69 mole percent and below about 75 mole percent of the fluorochloroethylene, such as trifluorochloroethylene. Copolymers containing above about 75 mole percent and below about 80 mole percent are still sufficiently soluble so that they may be applied as coatings from solutions. While the copolymer may not be completely soluble in a given quantity of the solvent, it will be present as a dispersion in the solvent and the solvent will soften the polymer sufficiently so as to make application by coating and dipping techniques possible. In employing the solvents of this invention, therefore, the concentration of solute is maintained between about 1 and about 30 weight percent and preferably where viscosity is a factor between 1 and 20 weight percent.

While satisfactory coatings are applied to various surfaces, e. g., metal, glass, etc. using these solvents singly, in many of the applications in which solvents are employed, viscosity and drying rate of the solution is a prime factor. Regardless of the type of application, the solvent should be retained until the solution is applied to the desired surface and should then evaporate at a uniform rate so as to avoid mud cracking, crazing, etc. To achieve this, blends of the above described solvents and, in addition, diluents which are miscible with the solvent but which are not solvents for the solute are employed. These diluents are the alcohols, the aromatics and the chlorinated hydrocarbons, such as amyl alcohol, butyl alcohol, isobutyl alcohol, toluene, xylene, benzene, trichloroethylene, carbon tetrachloride, etc. When these diluents are employed, preferably equal amounts by volume of diluent and solvent constitute the mixture although the solvent in which the copolymer is soluble constitutes from about 25 percent to about 95 percent by weight of the mixture dependent on the drying rate, viscosity, etc., which is desirable. When more than about 75 percent of the diluent is used, the copolymer precipitates from solution. After application, the solvents are allowed to evaporate either by air-drying at room temperature, or by force-drying at temperatures up to about 200° C. and preferably below about 175° C.

In order to illustrate the process of this invention the following examples, in which parts are by weight unless otherwise indicated, are presented.

Example I

The following composition was prepared:

| | Parts |
|---|---|
| Copolymer of trifluorochloroethylene / vinylidene fluoride (about 70/30 mole ratio) | 12.8 |
| Methyl ethyl ketone | 17.8 |
| Methyl isobutyl ketone | 11.9 |
| Butyl acetate | 18.0 |
| Amyl acetate | 5.1 |
| Ethyl butyl ketone | 8.8 |
| Toluene | 7.7 |
| Butyl alcohol | 12.8 |
| Amyl alcohol | 5.1 |

Using this solution, coatings were successfully applied by spray technique to glass, aluminum and steel panels.

Example II

Employing the copolymer of Example I, the following composition was prepared:

| | Grams |
|---|---|
| Copolymer | 80 |
| Zirconium silicate | 20 |
| Toluene | 150 |

The above composition was placed in a ball mill for 1 hour after which 250 gms. of methyl isobutyl ketone were added. This mixture was then milled for 18 hours to yield a coating composition containing 20 percent solids. This coating composition was applied successfully to glass and metal surfaces by spraying.

Example III

Employing the copolymer of Example I, 20 weight percent was dissolved in a 50/50 mixture of methyl ethyl ketone and ethyl butyl ketone. Films of the copolymer were cast from this solution as follows: a 5 mil film in 1 coating; an 11–12 mil film in 4 coats and a 5–6 mil film by spraying. All films were applied to glass and were air-dried. The films were continuous, pinhole free, and resistant to white fuming nitric acid penetration.

In connection with solubility, it should be noted that it is often desirable to reduce the molecular weight of the finished copolymer of the present invention, in order to obtain greater solubility in organic solvents, such as those indicated above. This is of importance in order to vary the softness of the polymer for easier processability. The polymerization reactions which are carried out in the presence of the polymerization type catalysts of the present invention normally tend to form very high molecular weight copolymeric products. Reduction of the strength of the recipe of polymerization catalyst merely slows the rate of reaction without affecting appreciably the molecular weight of the finished copolymer. It has been found, however, that the addition of various polymerization modifiers appreciably reduces the molecular weight of the copolymer products, and increases their solubility and ease of processability without affecting, unduly, the overall yield. Suitable polymerization modifiers include chloroform ($CHCl_3$), Freon 113

($CF_2ClCFCl_2$)

carbon tetrachloride ($CCl_4$), trichloroacetyl chloride ($CCl_3COCl$), dodecyl mercaptan ($C_{12}H_{25}SH$), and bromotrichloroethane $CBrCl_3$. These modifiers are preferably added in amounts between about 1 to 10 parts, by weight, per 100 parts of total perfluorochloroethylene and fluoroethylene monomers charged to the polymerization reaction. Of these modifiers dodecyl mercaptan is preferred. This particular modifier appears to be much more powerful in function, than any of the others disclosed above and is, therefore, preferably employed in quantities ranging from 0.01 to 0.3 parts per 100 parts of total monomer charged to the polymerization reaction.

The following examples are offered for a better understanding of the present invention and are not to be construed as limiting its scope.

Example IV

This example is intended to illustrate the preparation of a copolymer of trifluorochloroethylene and vinylidene fluoride.

The following water-suspension type recipe was employed in carrying out the polymerization reaction:

| | Parts by weight | |
|---|---|---|
| Water, distilled | 200 | |
| $CF_2=CFCl$ | 92.2 | } 86/14 molar. |
| $CF_2=CH_2$ | 7.8 | |
| $(NH_4)_2S_2O_8$ | 2.0 | |
| $Na_2S_2O_5$ | 0.8 | |
| $FeSO_4 \cdot 7H_2O$ | 0.2 | |

Catalyst and activator solution was prepared by dissolving 2 parts of $(NH_4)_2S_2O_8$ in 20 parts of water. Next, 0.8 part of $Na_2S_2O_5$ were dissolved in another 20 parts of water. In still another 20 parts of water, 0.2 part of $FeSO_4 \cdot 7H_2O$ was dissolved.

140 parts of water were next charged to a silver-lined steel bomb. The aforementioned $(NH_4)_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours.

The residual monomer was then vented from the bomb and a mixture of water and particles of resinous polymer were discharged. These particles were washed with hot water to remove residual salts, and were then dried in vacuo at room temperature.

The mole percent of $CF_2=CFCl$, combined in the resulting copolymeric product was 75 percent and the conversion was 27 percent.

Example V

The procedure, illustrated by Example IV, was repeated except that the following water-suspension type recipe was employed in the preparation of the trifluorochloroethylene/vinylidene fluoride copolymer:

| | Parts by weight | |
|---|---|---|
| Water, distilled | 200 | |
| $CF_2=CFCl$ | 94.2 | } 90/10 molar. |
| $CF_2=CH_2$ | 5.8 | |
| $(NH_4)_2S_2O_8$ | 3.0 | |
| $Na_2S_2O_5$ | 1.2 | |
| $FeSO_4 \cdot 7H_2O$ | 0.3 | |

The mole percent of $CF_2=CFCl$ combined in the resulting copolymeric product was 76 percent and the conversion was 14 percent.

Example VI

The procedure, illustrated by Example IV, was repeated except that the following water-suspension type recipe was employed in the preparation of the trifluorochloroethylene/vinylidene fluoride copolymers:

| | Parts by weight | |
|---|---|---|
| Water, distilled | 200 | |
| $CF_2=CFCl$ | 92.4 | } 87/13 molar. |
| $CF_2=CH_2$ | 7.6 | |
| $(NH_4)_2S_2O_8$ | 2.0 | |
| $Na_2S_2O_5$ | 0.8 | |
| $FeSO_4 \cdot 7H_2O$ | 0.2 | |

The mole percent of $CF_2=CFCl$ combined in the resulting copolymeric product was 74 percent and the conversion was 20 percent.

Example VII

The procedure, illustrated by Example IV, was repeated except that the following water-suspension type recipe was employed in the preparation of the trifluorochloroethylene/vinylidene fluoride copolymer:

|  | Parts by weight |  |
|---|---|---|
| Water, distilled | 200 | |
| $CF_2=CFCl$ | 92.4 | 87/13 molar. |
| $CF_2=CH_2$ | 7.6 | |
| $(NH_4)_2S_2O_8$ | 1.5 | |
| $Na_2S_2O_5$ | 0.6 | |
| $FeSO_4.7H_2O$ | 0.15 | |

The mole percent of $CF_2=CFCl$ combined in the resulting copolymeric product was 76 percent and the conversion was 20 percent.

Example VIII

The procedure, illustrated by Example IV, was repeated except that the following water-suspension type recipe was employed in the preparation of the trifluorochloroethylene/vinylidene fluoride copolymer:

|  | Parts by weight |  |
|---|---|---|
| Water, distilled | 200 | |
| $CF_2=CFCl$ | 87.8 | 80/20 molar. |
| $CF_2=CH_2$ | 12.2 | |
| $(NH_4)_2S_2O_8$ | 1.5 | |
| $Na_2S_2O_5$ | 0.6 | |
| $FeSO_4.7H_2O$ | 0.15 | |

The mole percent of $CF_2=CFCl$ was 76 percent and the conversion was 54 percent.

Example IX

This example is intended to illustrate the preparation of a copolymer of trifluorochloroethylene and vinylidene fluoride, employing an organic peroxide promoter, viz., trichloroacetyl peroxide, in a mass polymerization system to produce a resinous copolymer.

The polymerization was carried out in a glass tube containing a feed comprising about 85 mole percent trifluoroethylene and about 15 mole percent vinylidene fluoride, in the presence of trichloroacetyl peroxide as the promoter. Trichloroacetyl peroxide was employed in an amount of 0.037 part per 100 parts of total monomers charged. The tube was was placed in a bath maintained at a temperature of approximately −15° C. for a period of about five days. At the end of that time, the tube was removed from the bath. The remaining unreacted monomers were vented from the tube. The solid copolymer was recovered and dried in an oven at about 120° C. The mole percent of trifluorochlorethylene combined in the copolymer was found to be about 77.5 percent with a 25 percent conversion of the total monomers charged. It was found that a resinous, colorless material had been produced.

Example X

The procedure, illustrated by Example IX, was repeated, employing trichloroacetyl peroxide in the amount previously indicated, as an organic peroxide promoter, in a mass polymerization system, to produce a resinous copolymer.

The polymerization was carried out in a glass tube containing a feed comprising about 75 mole percent trifluorochloroethylene and about 25 mole percent vinylidene fluoride. The tube was placed in a bath maintained at a temperature of approximately −15° C. for a period of about four days. At the end of that time, the tube was removed from the bath. The remaining unreacted monomers were vented from the tube. The solid copolymer was recovered and dried in an oven at about 120° C.

The mole percent of trifluorochloroethylene combined in the copolymer was found to be about 70.5 percent with a 32 percent conversion of the total monomers charged. It was found that a resinous, colorless material had been produced.

As previously indicated, the water-suspension recipe type catalysts, employed in carrying out the polymerization reaction to produce the improved copolymers of the present invention contain an oxidant, in the form of a persulfate, or other peroxy compounds, of this type; a reductant, which is preferably a bisulfite, and a variable valence metal salt, which is preferably in the form of an iron salt. In this respect, it should be noted that the presence of the reductant and variable valence metal salt makes possible an increase in the quantity of free radicals which facilitates the ease of polymerization. However, it is also within the scope of this invention to carry out the polymerization reaction with the aforementioned water-suspension type recipe, in which the recipe contains only an oxidant, (e. g., one of the aforementioned peroxy compounds) and eliminate the presence of either the reductant or variable valence metal salt, or both.

As previously indicated, the resinous copolymers of the present invention prepared by copolymerizing a perfluorochloroethylene with a fluoroethylene within the critical molar ratios and under the polymerization conditions previously described, possess unusual and highly desirable chemical and physical properties which make them particularly suited as durable, relatively hard coatings for application to various metallic and other rigid surfaces. These copolymers may be used, in a preferred form, as coatings for metallic surfaces employed in the manufacture of aircraft component parts, such as aluminum surfaces of tanks and other components exposed to strong reagents. They may also take the form of protective suitings, protective envelopes, and other articles of manufacture which are comprised of exposed surfaces which may be subjected to abrasion or other forms of impact in the course of performing their function under special environmental conditions. Particular applicability of the copolymers of the present invention is to be found when they are employed as protective coatings on surfaces, such as stated above, which are to be subjected to environmental conditions in which they may come into contact with corrosive substances, such as, oils, fuels and various powerful reagents, as previously described, and over a wide temperature range. These copolymeric coatings are found to have high tensile strength, good resinous properties, high heat-resistance, and ease of solubility in various solvents, when in their raw copolymeric state for application to various surfaces. Of special importance is their quality of relatively high hardness. These advantages are only obtainable by forming the copolymers, under the polymerization conditions previously described, and within the molar ratios previously defined (viz., with a content of the perfluorochloroethylene in an amount which is higher than 69 mole and not higher than about 80 mole percent, and the remaining major constituent being the fluoroethylene).

When employed as protective coatings, for any of the surfaces described above, the raw copolymer is dissolved in a suitable solvent to obtain an adherent cement. Solution of the copolymer effected by forming a mixture of the copolymer with at least one of the oxygen-containing solvents described above, and maintaining the copolymer in contact with the solvent under suitable conditions for a sufficient period of time to effect the solution. Usually the solution is prepared by mixing the solvent and the copolymer in blending equipment, such as a ball mill, pebble mill, etc. Elevated temperatures, i. e., temperatures up to the boiling point of the solvent can be employed to hasten the formation of the solution. The solutions which are prepared as described above, exist and are stable, i. e., do not precipitate, at room temperature. In connection with the solvents, it should be noted that these are relatively low boiling compounds having a boiling point between about 55° C. and about 160° C. Oxygen-containing compounds boiling above about 160° C. are not suitable since they are not efficient solvents for the copolymer except, possibly, at elevated temperatures and, additionally since they are not volatile enough for the intended purpose.

As indicated previously, the solutions of this invention can be applied to fabric, metal and glass and other surfaces by employing apparatus, such as a knife-spreader, a doctor-blade, a reverse roll-coater and by spray, brush and dip coating techniques. After the solution has been applied to the desired surface, the solvent is allowed to evaporate either at room temperature or preferably, in order to facilitate evaporation by heating at slightly elevated temperatures, that is temperatures below 200° C. The copolymer coating can be applied to the desired surface either by a single coating application or by application of a number of coatings. In this latter instance, the solvent is permitted to evaporate after each application. As indicated previously, the viscosity of the solution can be adjusted by the addition of at least one non-solvent inert diluent. These non-solvent inert diluents should have a boiling point approximating (i. e. within about 20° C.) the boiling point of the solvent, and below about 160° C. For special purposes, pigments, fillers and other additions can be blended with the copolymer.

Various alterations and modifications of the invention and its aspects may become apparent to those skilled in the art without departing from the scope of this invention.

Having thus described my invention, I claim:

1. A solution which comprises as a solute a copolymer containing between above 69 and not higher than about 80 mole percent of a perfluorochloroethylene copolymerized with a different partially fluorinated ethylene as the remaining major constituent and as a solvent at least one oxygen containing saturated aliphatic organic compound having a boiling point between about 55° C. and about 160° C. of the group consisting of esters, ketones and ether alcohols.

2. A solution which comprises as a solute a copolymer containing between above 69 and not higher than about 80 mole percent of trifluorochloroethylene copolymerized with vinylidene fluoride as the remaining major constituent and as a solvent at least one oxygen containing saturated aliphatic organic compound having a boiling point between about 55° C. and about 160° C. of the group consisting of esters, ketones and ether alcohols as a solvent.

3. A solution which comprises as a solute a copolymer containing above 69 and not higher than about 80 mole percent of trifluorochloroethylene copolymerized with vinylidene fluoride as the remaining major constituent and as a solvent a saturated aliphatic ketone having a boiling point between about 55° C. and about 160° C.

4. The solution of claim 3 in which the ketone is methyl ethyl ketone.

5. The solution of claim 3 in which the ketone is methyl-isobutyl ketone.

6. A solution which comprises as a solute a copolymer containing above 69 and not higher than about 80 mole percent of trifluorochloroethylene copolymerized with vinylidene fluoride as the remaining major constituent and as a solvent a saturated aliphatic ester having a boiling point between about 55° C. and about 160° C.

7. The solution of claim 6 in which the ester is ethyl acetate.

8. The solution of claim 6 in which the ester is amyl acetate.

9. A solution which comprises as a solute a copolymer containing above 69 and not higher than about 80 mole percent of trifluorochloroethylene copolymerized with vinylidene fluoride as the remaining major constituent and as a solvent a saturated aliphatic ether alcohol having a boiling point between about 55° C. and about 160° C.

10. The solution of claim 9 in which the ether alcohol is ethoxy ethanol.

11. A solution which comprises as a solute a copolymer containng above 69 and not higher than about 80 mole percent of trifluorochloroethylene copolymerized with vinylidene fluoride as the remaining major constituent, as a solvent at least one oxygen containing saturated aliphatic organic compound having a boiling point between about 55° C. and about 160° C. of the group consisting of ketones, esters and ether alcohols and as an inert diluent at least one organic compound having a boiling point below about 160° C. of the group consisting of saturated aliphatic alcohols, aromatics hydrocarbons and aliphatic chlorinated hydrocarbons.

12. The solution of claim 11 in which the inert diluent is a saturated aliphatic alcohol boiling below about 160° C.

13. The solution of claim 12 in which the alcohol is amyl alcohol.

14. The solution of claim 12 in which the alcohol is butyl alcohol.

15. The solution of claim 11 in which the inert diluent is an aromatic hydrocarbon boiling below about 160° C.

16. The solution of claim 15 in which the aromatic is toluene.

17. The solution of claim 15 in which the aromatic is xylene.

18. The solution of claim 11 in which the inert diluent is an aliphatic chlorinated hydrocarbon boiling below about 160° C.

19. The solution of claim 18 in which the chlorinated hydrocarbon is carbon tetrachloride.

20. The method for preparing solutions of copolymers containing above 69 and not higher than about 80 mole percent of a perfluorochloroethylene copolymerized with a different partially fluorinated ethylene as the remaining major constituent which comprises forming a mixture of said copolymer with an oxygen containing saturated aliphatic organic compound having a boiling point between about 55° C. and about 160° C. of the group consisting of ketones, esters and ether alcohols and maintaining said mixture under conditions of temperature and time such that a homogeneous solution containing at least 1 percent of said copolymer is formed.

References Cited in the file of this patent

UNITED STATES PATENTS 2,484,483    Berry  ---------------- Oct. 11, 1949

UNITED STATES PATENT OFFICE
CERTIFICATE OF CORRECTION

Patent No. 2,770,605                                           November 13, 1956

Francis J. Honn

It is hereby certified that error appears in the printed specification of the above numbered patent requiring correction and that the said Letters Patent should read as corrected below.

Column 3, line 29, for "one" read -- on --; column 4, line 56, for "a shown" read -- as shown --; column 5, line 58, for "coating" read -- coatings --; column 9, line 44, for "trifluoro-" read -- trifluorochloro- column 12, line 26, for "aromatics" read -- aromatic --.

Signed and sealed this 5th day of August 1958.

(SEAL)
Attest:
KARL H. AXLINE

Attesting Officer

ROBERT C. WATSON
                                                                       Commissioner of Patents